United States Patent [19]

Baker et al.

[11] Patent Number: 4,857,080
[45] Date of Patent: Aug. 15, 1989

[54] ULTRATHIN COMPOSITE METAL MEMBRANES

[75] Inventors: Richard W. Baker, Palo Alto; Jenny Louie, Fremont; Peter H. Pfromm, Palo Alto; Johannes G. Wijmans, Menlo Park, all of Calif.

[73] Assignee: Membrane Technology & Research, Inc., Menlo Park, Calif.

[21] Appl. No.: 127,946

[22] Filed: Dec. 2, 1987

[51] Int. Cl.$^4$ .............................................. B01D 53/22
[52] U.S. Cl. ............................................. 55/16; 55/68; 55/158; 427/250; 427/255.7; 427/296
[58] Field of Search ............... 55/16, 158, 68; 427/50, 427/51, 250, 255.7, 296

[56] References Cited

U.S. PATENT DOCUMENTS

| | | | |
|---|---|---|---|
| 2,773,561 | 12/1956 | Hunter | 55/158 |
| 2,824,620 | 2/1958 | DeRosset | 55/16 |
| 2,958,391 | 11/1960 | DeRosset | 55/16 |
| 3,155,467 | 11/1964 | Yamamoto et al. | 55/16 |
| 3,172,742 | 3/1965 | Rubin | 55/16 |
| 3,232,026 | 2/1966 | McKinley | 55/16 |
| 3,241,298 | 3/1966 | Pierce | 55/158 X |
| 3,350,845 | 11/1967 | McKinley | 55/16 |
| 3,413,777 | 12/1968 | Langley et al. | 55/158 |
| 3,428,476 | 2/1969 | Langley et al. | 55/16 X |
| 3,468,781 | 9/1969 | Lucero | 55/16 X |
| 3,630,690 | 12/1971 | Coppola | 55/16 X |
| 3,678,654 | 7/1972 | Low et al. | 55/16 |
| 3,713,270 | 1/1973 | Farr et al. | 55/16 |
| 3,980,456 | 9/1976 | Browall | 55/158 |
| 4,132,668 | 1/1979 | Gryaznov et al. | 427/404 X |
| 4,230,463 | 10/1980 | Henis et al. | 55/68 X |
| 4,254,086 | 3/1981 | Sanders | 422/187 |
| 4,313,013 | 1/1982 | Harris | 585/818 |
| 4,496,373 | 1/1985 | Behr et al. | 55/16 |
| 4,599,157 | 7/1986 | Suzuki et al. | 55/158 X |
| 4,655,797 | 4/1987 | Iniotakis et al. | 55/16 |
| 4,746,333 | 5/1988 | Peinemann et al. | 55/16 X |

FOREIGN PATENT DOCUMENTS

| | | | |
|---|---|---|---|
| 144054 | 6/1985 | European Pat. Off. | 55/158 |
| 43153 | 11/1978 | Japan | 55/16 |
| 8510 | 1/1983 | Japan | 55/158 |
| 177117 | 10/1984 | Japan | 55/16 |
| 138516 | 6/1986 | Japan | 55/158 |
| 1292025 | 10/1972 | United Kingdom | 55/16 |

OTHER PUBLICATIONS

"Permeation of Gases through Metallized Polymer Membranes" P. Mercea, L. Muresan, V. Mecea, Journal of Membrane Science 24 (1985), 297–307.

"A New Hydrogen Recovery Route", R. McBride and D. McKinley, Chem. Eng. Prog., 61 (3) (1965), 81–85.

*Primary Examiner*—Robert Spitzer
*Attorney, Agent, or Firm*—J. Farrant

[57] ABSTRACT

An ultrathin, high-flux composite membrane for use in gas separation. The membrane comprises a metal layer, typically 500Å or less thick on a microporous support. The support may be as asymmetric Loeb-Sourirajan type membrane or a two-layer composite of a microporous substrate with a very thin sealing layer. The support gives mechanical strength to the membrane but does not contribute significantly to the selectivity. Optionally the metal layer may be overcoated with a second polymeric sealing layer to plug any defects and to protect the fragile surface from mechanical damage. The membrane is particularly useful in the purfication of hydrogen.

17 Claims, 3 Drawing Sheets

ULTRATHIN COMPOSITE METAL MEMBRANES

This invention was made with government support under Contract No. DAAK70-85-C-0083, awarded by the Department of the Army. The government has certain rights in this invention.

FIELD OF THE INVENTION

The invention relates to ultrathin and ultraselective composite metal or metal-alloy membranes for gas separation.

BACKGROUND OF THE INVENTION

Hydrogen is one of the most important industrial gases. In 1981 nearly $4 \times 10^{12}$ scf of hydrogen were produced and consumed in the United States. The bulk of this hydrogen is used in ammonia synthesis and in the petroleum refining industry, both in hydrocracking and hydrodesulfurization, and as a refinery fuel. The remainder is used in methanol synthesis, the aerospace industry and other specialized applications.

Hydrogen is produced from coal, methane, or oil, and must be separated from carbon dioxide before use, a factor which contributes significantly to the cost of the gas. Also, a number of industries using hydrogen produce bleed streams and off-gases containing significant quantities of hydrogen which are too impure to recycle without treatment. Recovery and re-use of hydrogen is frequently desirable in these cases. For example, in ammonia synthesis plants, recycling of hydrogen from purge gases containing hydrogen, argon, and methane can improve operating efficiency up to 5%.

Conventional techniques used to purify include cryogenic units and various absorption and adsorption processes. For hydrogen recovery in ammonia plants, cryogenic units have traditionally been the principal method used. Where very high purity hydrogen is needed, pressure swing adsorption, which can produce hydrogen that is 99.999% pure in a single pass, has been the preferred method.

As an alternative to this conventional technology, in recent years synthetic semipermeable membrane processes have been developed which can be used for hydrogen separation, and in fact, more than 60 membrane-based hydrogen generating plants are now in operation worldwide. Most of these plants separate hydrogen from nitrogen, argon, or methane. The more common problem, that of separating hydrogen from carbon dioxide, cannot be tackled economically by existing membranes, which are insufficiently selective. The polymer membranes used in existing plants are asymmetric in structure, consisting of an extremely thin permselective layer, 1 micron or less in thickness, supported on a microporous, non-selective support layer. Because the permselective layer is thin, the permeate fluxes are relatively high, and compact plants are possible. Apart from a gas compressor, membrane-based units have no moving parts, and are adaptable to large- or small-scale operations. Membrane processes are also relatively energy efficient when compared with other technologies. However, present polymer membranes are unable to produce hydrogen with a purity of 99% from feed streams containing 80% or less hydrogen in a single step. They also cannot operate in circumstances where high temperatures, in excess of 100° or 150° C. are involved. If hydrogen-separating membranes are to be widely applied to low-pressure, low-hydrogen-concentration feed streams, or to the separation of hydrogen from carbon dioxide, a major increase in membrane performance is needed. For applications where the separation is to be performed at high temperatures, such as for example in a fuel cell, there is also a need for high-flux, temperature-resistance membranes.

Palladium and palladium-alloy membranes are highly selective and operate at high temperatures. Because hydrogen has the unique property of dissolving in the metal membrane, a defect-free palladium membrane can produce completely pure hydrogen in one pass. These membranes were extensively studied during the 1950's and 60's, and this work led to the installation by Union Carbide of a plant to seperate hydrogen from a refining off-gas stream containing methane, ethane, carbon monoxide and hydrogen disulfide. The plant was able to produce 99.9% or better pure hydrogen in a single pass through the membrane. The plant operated with 25-micron-thick membranes, at a temperature of 370° C., and a feed pressure of 450 psi. The flux through the membranes was very low, however, and the process never became widely used. The low-flux problem could have been overcome by making much thinner membranes, because a decrease in the membrane thickness to 0.5 micron or less would increase the flux fifty-fold, to a level comparable with that of current composite polymer membranes. At the time however, ways to make ultrathin metal structures were not known, and the idea was dropped.

Nevertheless, there is an extensive patent literature which reflects the interest at the time in palladium membranes, U.S. Pat. Nos. 2,848,620 (1958) and 2,958,391 (1960) describe hydrogen separation using a thin film of palladium on a support of sintered metal particles. U.S. Pat. No. 3,232,026 (1966) teaches the use of palladium foils coated with palladium black for separating hydrogen from gas mixtures. U.S. Pat. Nos. 3,413,777 (1968) describe a "diffusion element" of a thin film of palladium in a vitreous glaze on a ceramic support. U.S. Pat. No. 3,630,690 (1971) discloses a hydrogen exhaust pump for use in hydrocracking containing a palladium substrate layer. U.S. Pat. No. 3,678,654 (1972) teaches a pervaporation-type process for recovery of dissolved hydrogen from water using a palladium-silver alloy tubes coated with palladium black. U.S. Pat. No. 4,254,086 (1981) describes a ceramic substrate coated with thin films of palladium and used in the thermal dissociation of water. In general, the palladium layers in each of these inventions are relatively thick, typically of the order 1 mil. There are also many patents covering palladium alloys useful for gas separation. For example, U.S. Pat. No. 2,773,561 (1956) claims a gas separation process using palladium-silver alloys; U.S. Pat. No. 3,155,467 (1964) describes alloy "walls" containing gold, ruthenium, or platinum; U.S. Pat. No. 3,172,742 (1965) discloses alloys suitable for hydrogen diffusion incorporating a percentage of uranium; U.S. Pat. Nos. 3,238,700 (1966) covers palladium/ruthenium alloys; 3,350,845 (1967) covers palladium/gold alloys; U.S. Pat. No. 3,713,270 (1973) describes the advantages of palladium/cerium or palladium/yttrium membranes, and so on. Again the thickness of the metal films in these patents is typically a few mils. It is also known that metals other than palladium may exhibit solution and diffusion of atomic hydrogen. For example, U.S. Pat. No. 2,958,391 discusses hydrogen permeation through films made from other metals in Group 8 of the Periodic Table such as iron, nickel, copper and platinum. Metals from Groups 4B, 5B and 6B of the Periodic Table such as zirconium, titanium, niobium, vanadium, tantalum and molybdenum are also known to permeate hydrogen. The ability of other gases to permeate metal films is also known, for example, from a paper by Mercea et al. entitled "Permeation of Gases through Metallized Polymer Membranes", (Journal of Membrane Science, Vol. 24, 1985).

However, because of their very low fluxes, their need to operate at high temperatures and high feed pressures, and their expense, metal membranes have been generally considered inferior to polymer membranes, and have found no large-scale industrial application. With the development of modern vacuum deposition techniques, however, a method is now available to make much thinner metal films than was previously possible. U.S. Pat. No. 4,132,668 describes a method of making a hydrogen-permeable palladium membrane catalyst. The structure comprises a substrate of a porous metal sheet, such as stainless steel, an intermediate silicone rubber layer, and a catalytically active layer of palladium or palladium alloy, which is 0.1 micron or less thick, deposited on the polymer layer. U.S. Pat. No. 3,468,781 describes a membrane for use in a polarographic cell. The membrane comprises a layer of palladium or palladium alloy, typically 200 Å or less thick, on a non-porous polystyrene film or similar support. Because of the thickness of the polymer layer employed in each of the above cases, however, the permeate flux is still far too low to be economically competitive. Thus, despite the prior teachings of the art, there remains a need for high-flux, high-selectively, membrane-based gas separation systems.

SUMMARY OF THE INVENTION

It is an object of the present invention then to provide a high-flux metal membrane for use in gas separation.

It is a further object of the invention to provide ultrathin, high-flux palladium membranes for purification of hydrogen gas streams.

It is yet another object of the invention to provide metal membranes for gas separation applications capable of operating at moderate temperatures and feed pressures.

It is another object of the invention to provide a single-stage membrane-based system for production of high purity hydrogen.

It is yet another object of this invention to provide a small, economic unit for production of high purity hydrogen from hydrogen-containing feed gas streams.

It is a further object of the invention to provide a method of making ultrathin, high-flux composite metal membranes.

It is another object of the invention to provide a process for separating one component from a gas mixture.

Other objects and advantages of the invention will be apparent from the description to those skilled in the art.

To achieve the foregoing objectives, the membranes of the present invention have a multilayer composite structure comprising an ultrathin metal layer on a polymer support. To facilitate deposition of the metal layer, the surface of the support should be smooth, and non-porous or very finely porous. Ideally the support should not influence the performance of the finished composite. This will only be possible if the resistance of the support membrane to gas flow is much lower than the resistance of the metal layer. The ideal support then should continue a high gas flux with an essentially non-porous, or defect-free, surface on which the metal layer can be deposited. Because high permeability is usually associated with high porosity, and low permeability with low porosity, it is preferable, although not essential, to use a two-layer support. The substrate layer is highly microporous, and presents essentially no resistance to gas flow. Onto this layer is coated an intermediate layer, which plugs pores or other defects in the substrate layer, and provides a smooth, defect-free surface for deposition of the metal selective layer. The intermediate layer is very thin, and is highly permeable to gas flow.

The two-layer support membrane may be prepared by techniques known in the art for preparation of selective gas separation membranes. These methods are discussed in detail below. Typically, the ultrathin metal layer may be deposited on the polymer support by a vacuum deposition technique such as vacuum evaporation or vacuum sputtering. These techniques are known and are used for preparing semiconductor chips, optical coatings, packaging materials and other metallizes laminates. After metal deposition, the composite membranes may optionally be overcoated with a very thin polymer layer to prevent bulk flow of gases through any membrane defects, and to protect the fragile metal layer from mechanical damage.

DETAILED DESCRIPTION OF THE INVENTION

The term permselective as used herein refers to membranes or membrane materials that exhibit selective permeation for at least one gas in a mixture over the other gases in that mixture, enabling a measure of separation between components to be achieved.

The word palladium as used herein refers to palladium or palladium alloys.

The term ultrathin as used herein refers to membranes or membrane layers that are less than 5 microns thick, and preferably less than 2 microns thick.

The term rubbery as used herein means having a glass transition temperature at least 20° C. below the normal operating temperature of the membrane.

The word hydrogen as used herein refers to any hydrogen isotope.

The present invention is concerned with the use of ultrathin metal membranes for gas separations, and in particular for the purification of hydrogen. The ability of some metals to dissolve and permeate gas atoms has been known for many years, and in particular, hydrogen permeation through palladium has been studied. It has also been known for many years that repeated cycles of heating and cooling of palladium membranes in a hydrogen atmosphere may result in deformation, cracking or complete rupture of the membranes. The present invention then is intended to embrace both ultrathin films of pure metal and metal alloys. Because of the extensive literature and consequent knowledge of its behavior, palladium is the preferred metal for use in the present invention. Preferred alloys that may be used in the present invention include palladium with a metal from Group 1B of the Period Table, such as copper, gold, or silver; palladium with a metal from Group 8 in the Periodic Table, such as ruthernium, osmium, nickel or platinum; or combinations of these. A particularly preferred alloy is palladium/silver, especially alloys with a proportion of silver in the range 20–40%, which have been shown to have an enhanced hydrogen permeability compared with pure palladium. The invention should not be construed as limited to any particular metal however, but is intended to include any ultrathin metal film that has suitable flux and selectivity characteristics.

Figure 1:
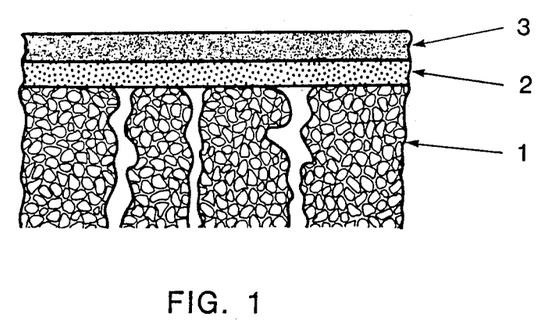
FIG. 1 shows a basic embodiment of the invention, including a polymer substrate layer, an intermediate sealing layer, and an ultrathin metal layer.
Figure 2:
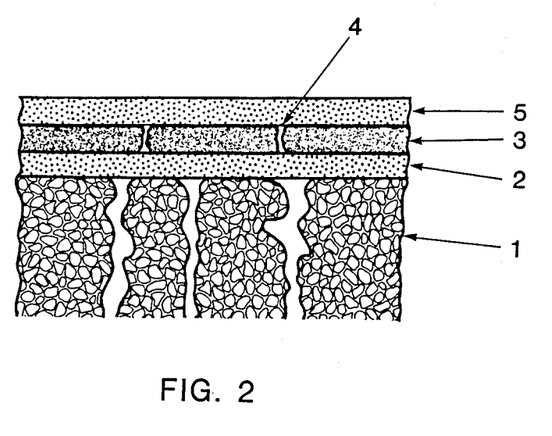
FIG. 2 shows a preferred embodiment of the invention, including a polymer substrate layer, an intermediate sealing layer, an ultrathin metal layer, and a top sealing and protective layer.
Figure 3:
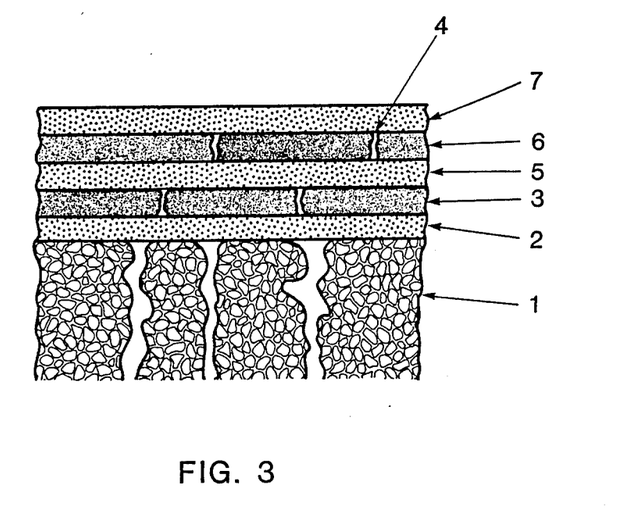
FIG. 3 shows an alternative embodiment of the invention, including multiple layers of metal.

Referring now to the drawings, FIG. 1 shows a basic embodiment of the invention comprising a microporous support membrane 1, onto which is coated an ultrathin sealing layer 2, which is in turn overcoated with an ultrathin metal layer 3. FIG. 2 shows a preferred embodiment comprising a microporous support membrane 1, an intermediate sealing layer 2, an ultrathin metal layer 3, and a top sealing and protective layer 5. FIG. 3 shows an alternative embodiment comprising a microporous support membrane 1, an ultrathin sealing layer 2, an ultrathin metal layer 3, a sealing and protective layer 5, a second metal layer 6, and a final top sealing and protective layer 7.

In each case, the function of the microporous support membrane is to give physical strength to the composite structure, and it has no selective properties per se. It should have a very small flow resistance compared to the permselective layer. Preferably, the microporous support membrane will be an asymmetric membrane with a relatively dense surface layer. The surface pore size should be sufficiently small that the sealing or permselective polymer can form a continuous coating that bridges or plugs the pores without defects. Normally a surface pore size of 1 micron or less is preferred. Techniques for casting finely microporous membranes are well known in the art, and are discussed in detail, for example, in *Synthetic Polymeric Membranes*, Second Edition, Robert E. Kesting, McGraw-Hill, New York (1985), Chapter 7, incorporated herein by reference. The choice of polymer used to make the microporous support, while not critical to the invention, is important. The physical properties of the support should contribute sufficient mechanical strength to the composite that it can withstand prolonged exposure to the pressure differences under which gas separation membranes operate, typically up to 1500 psi. The ultrathin metal membranes of the present invention do not need to operate at the elevated temperatures that are required for thick films. Nevertheless, there are applications where temperatures resistance is desirable. Thus, polymer materials that can operate up to 100° C. or even 150° C. are advantageous, although not essential. The support material should be capable of forming a smooth surface onto which the other layers of the composite may be coated, and it should be able to withstand attack by solvents that might be used to apply the intermediate sealing layer. Suitable polymers that may be used to make the microporous membrane include, but are not limited to polysulfones, such as Udel ® P3500 (Union Carbide, Danbury, Conn.); polyamides, for example Nomex ® (DuPont, Wilmington, Del.), or Trogamide-T ® (Dynamit Nobel, Rockleigh, N.J.); crosslinked polyimides; polyetherether ketones, such as Victrex ® (ICI Americas Inc., Wilmington, Del.) or UltrasonE ® (BASF, Ludwigshafen, West Germany); polyetherimides, such as various grades of Ultem ® (GKSS, Geesthacht, West Germany); and polytetrafluoroethylene (Teflon ®, W. L. Gore, Elkton, MD). Some commercially available membranes might be usable in this context, depending on their solvent resistance. Examples include the NTU ® 3050 a solvent resistant ultrafiltration membrane, and the NTU ® 4220, both available from Nitto Electric Industrial Co., Osaka, Japan. Optionally, other possible support membranes are to be found among those described in an article by H. Strathmann, K. Kock, P. Amar and R. W. Baker, in "The Formation Mechanism of Asymmetric Membranes", Desalination 16, 175 (1975). Further example of polymers which may be used to prepare the microporous support layer may be found among those listed in U.S. Pat. No. 4,230,463 to Henis and Tripodi, column 14, lines 14 through 54, which is incorporated herein by reference. Preferred support materials are polysulfone and polyetherimide. The support membrane should be sufficiently thick to provide some physical robustness to the composite, but not so thick as to impair permeability characteristics. Generally a thickness of 30–200 microns is envisaged, with a preferred thickness of approximately 50 microns.

The intermediate sealing layer is intended to plug pores or other defects in the microporous support, to prevent bulk flow of gases, and to provide a very smooth unbroken layer onto which the permselective metal layer may be coated. Thus the chosen material should be capable of wetting the substrate in such a way as to form a smooth continuous coating. The sealing material should also exhibit high gas permeability, so as not to detract from the overall flux. A particularly preferred material for the sealing layer is silicone rubber, which has good permeability characteristics and wets the microporous support freely in solution. Constituents for preparing silicone rubber, such as polymerizable oligomers or linear polymers, may be obtained from General Electric Co., Waterford, N.Y., or Dow Corning Co. Midland, Mich. Silicone rubber is very permeable, and silicone rubber layers can easily be made thin enough by the techniques hereinafter described in detail to allow a high gas or vapor flux. The thickness of the sealing layer should preferably be less than 5 microns, generally in the range 0.5 to 2 microns, and ideally 1 micron or less. If the silicone rubber layer is made too thin, it may become susceptible to etching by the argon plasma used in the vacuum sputtering method described below, resulting in small pinholes in the layer, which in turn affect the performance of the finished composite. Adherence of the metal deposit to the silicone rubber film may also be a problem in some cases. Alternative preferred materials that may be used should these problems arise include, for example, poly(dimethyl-diphenyl siloxane) or poly(dimethylsiloxan-silicone carbonate), both available from Petrarch Chemicals (Bristol, Pa.) poly(ether-ester-amide), available from Atochem (Birdsboro, Pa.) and polymethylpentene (TPX ®) available from Mitsui Chemicals (Tokyo, Japan). These materials are all less permeable to hydrogen than silicone rubber but many withstand the vacuum deposition atmosphere better.

To prepare the preferred embodiment of the invention shown in FIG. 1, the microporous support membrane must first be cast. The preferred membrane for the microporous substrate is an asymmetric Loeb-Sourirajan type membrane. The membranes have a dense, very finely microporous skin layer with an underlying open structure. Casting techniques for such membranes are well-known in the art. References that teach the preparation of asymmetric membranes are, for example, H. Strathmann, "Synthetic Membranes and their Preparation," and J.G. Wijmans and C. A. Smolders, "Preparation of Asymmetric Membranes by the Phase Inversion Process," both in *Synthetic Membranes: Science, Engineering and Applications*, P. M. Bungay, H. K. Lonsdale and M. N. Pinho (Ed), Ridel Publishing Co., Dordrecht, The Netherlands. In outline the process is as follows. A moving belt of polyester, or similar, fabric moves from a feed roll to a take-up roll. After leaving the feed roll, it passes over a drum, where it is contacted by a reservoir containing the casting solution, which consists of a polymer solution dissolved in a water miscible solvent. The casting solution is doctored onto the moving fabric belt by a blade. The belt then passes into a water bath which precipitates the polymer to form the membrane. The belt is collected on the take-up roll, after which the membrane is washed overnight to remove any remaining solvent and finally dried.

The intermediate sealing layer may then be coated on the microporous support by a number of techniques known in the art. The preferred method in the context of the present invention is solution coating. The principles of this method are described in detail in, for example, a paper by R. L. Riley, H. K. Lonsdale, D. R. Lyons and U. Merten, entitled "Preparation of Ultrathin Reverse Osmosis Membranes and the Attainment of the Theoretical Salt Rejection" in J. Appl. Poly. Sci. 11,2143,1967; and in a recent U.S. Pat. No. 4,234,701 to R. L. Riley and R. L. Grabowsky. To apply this method to the present invention, it is necessary to prepare a dilute solution of the polymer or prepolymer to be used. If silicone rubber is used for the sealing polymer, this may be coated from isooctane or freon solvents. Other polymers may require more aggressive solvents and the support substrate material must be chosen accordingly. A thin film of the polymer solution is deposited on the microporous support surface by immersing and then slowly withdrawing the support from the solution. This coats the travelling membrane support with a liquid layer 50 to 100 microns thick. The membrane then passes through a drying oven and is wound up on a variable-speed, motor-driven take-up. After evaporation of the solvent, a polymer film 0.1 to 20 microns thick is left on the membrane. The thickness and the number of defects in the coating depend on the concentration and viscosity of the solutions involved, the nature of the support membrane and the application parameters of the process. With the polymers of the present invention, the concentration in solution should preferably be 2% or less, and the coating solution temperature should be in the range 20° C. to 90° C., preferably 40° C. to 60° C. The thickness of the sealing layer after solvent evaporation should be 0.1 to 20 microns, preferably 5 microns or less, and more preferably 0.1 to 1 micron.

The permselective metal layer is then deposited onto the polymer support. In order to provide a membrane that is comparable with, or better than, currently available synthetic polymer membranes, the metal layer must be extremely thin, typically 0.5 microns or less. It must also be free of any defects, such as pinholes or cracks, that could ruin the selectivity by permitting flow through of other gases. Ultrathin films of this type can be deposited in a number of ways; electroless coating, vacuum evaporation, or vacuum sputtering. Vacuum sputtering is a microscopic process involving clouds of metal atoms, whereas vacuum evaporation involves large macroscopic lumps of material. Sputtering then is an atom-by-atom process which produces coatings that reproduce the surface finish of the specimen. Thus sputtering usually leads to fewer pinhole defects, and in general, the quality and reproducibility of metal layers obtained by vacuum sputtering is superior to those obtained by evaporation. Sputtering is the preferred method in the context of the present invention. Before it is placed in the sputtering chamber, the support membrane must be thoroughly cleaned to remove specks of dust or other contaminants that could result in an imperfect metal layer. Blowing the surface with gas under pressure is the preferred cleaning method, because it does not scratch or damage the support surface as mechanical cleaning techniques such as brushing might do. The gas used must be completely dry, to eliminate any possibility of condensation of water vapor on the support in the vacuum chamber.

Figure 4:
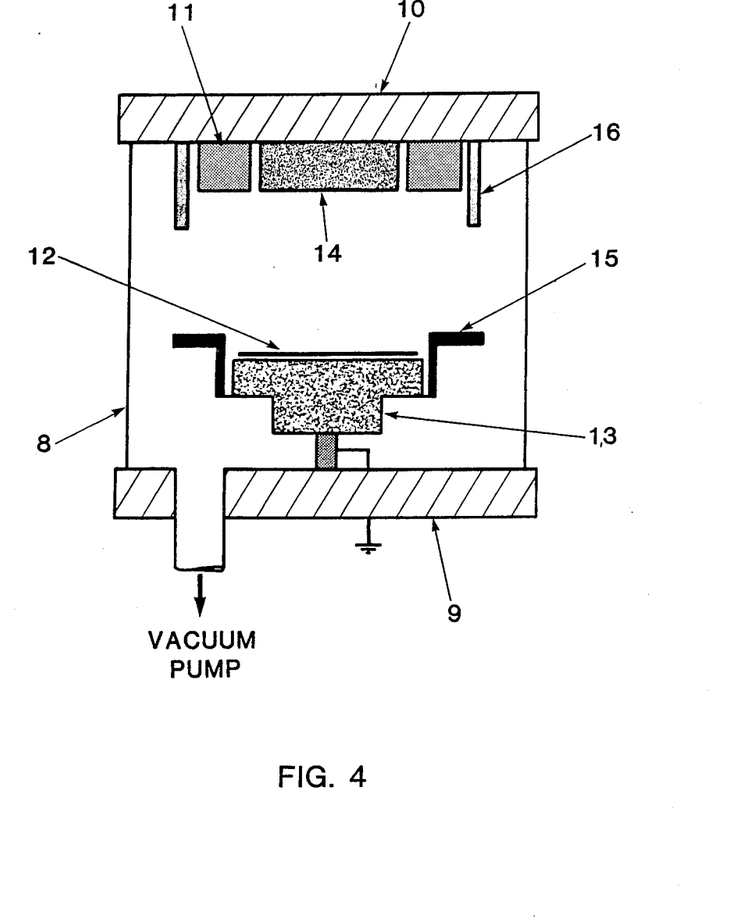
FIG. 4 is a schematic of a vacuum sputtering apparatus.

A schematic of a basic sputtering system is shown in FIG. 4. Referring now to this figures, the system comprises a pressure vessel 8, containing argon at a pressure of 20-60 millitorr. A cold plasma is formed by applying a high potential, typically around 3000 volts, between the negative top plate 10, and the positive base plate 9. This voltage ionizes the argon gas and produces a plasma consisting of argon ions and the corresponding electrons. The ionized atoms are heavy but have relatively little kinetic energy unless accelerated through an electric field. When this is done, they bombard the negatively charged metal target 11, and dislodge metal atoms which randomly diffuse and eventually adhere to the polymer membrane 12, which is supported on the pedestal 13. A problem associated with ion movement toward the target is the movement of electrons in the opposite direction, i.e. toward the substrate. These electrons transfer their energy to the support membrane, with an attendant increase in temperature and possible damage to the membrane. To avoid the damaging effects of electron bombardment, a planar magnet 14, is used to deflect the electrons in the plasma away from the membrane. In addition, an electrically charged dark space shield 15 surrounds the pedestal. This biased ring attracts electrons which may have escaped the magnetic field. A metal shield 16, helps to focus metal atoms from the target. The sputter time is normally in the range from a few seconds to one hour, depending on the operating characteristics of the system and the desired thickness of the finished coating. In general, the desired characteristics of the metal layer are that it should be as thin as possible consistent with a complete absence of pinholes, cracks, or other defects. Typically, the thickness will be in the range 100 to 1000 Å, preferably 300 to 500 Å.

Even when the utmost care is taken in all the preparation steps, it is not infrequently found that the finished membranes exhibit selectivities for the permeating gas over the non-permeating gas much lower than would be expected from theoretical calculations. These problems are probably due to small defects in the metal layer. The layer is also very fragile, and susceptible to damage during handling. For both these reasons, it is desirable to overcoat the metal layer with a second very thin polymer layer. This both seals defects, reducing the bulk flow of gases that cannot diffuse through the metal layer by as much as two orders of magnitude, and protects the finished membrane from mechanical abrasion or other damage. The material chosen obviously must satisfy the same criteria as that for the intermediate sealing layer, and thus would normally be the same, i.e. silicone rubber or one of the other choices listed above. This additional layer may be deposited by dip coating as described above, or by hand dipping or wicking, or by spraying. This preferred embodiment is shown in FIG. 2. The microporous substrate layer 1 is coated with an intermediate sealing layer 2, then overcoated with an ultrathin metal layer 3, as described in the basic embodiment above. The metal layer may contain a number of small holes or cracks 4. These defects are sealed by a further overcoating of a polymer layer 5.

As an alternative approach to the problem of minimizing the effect of defects in the metal layer, embodiments such as that shown in FIG. 3 are possible. In this case the microporous substrate layer 1 is coated with a sealing layer 2, then overcoated with an ultrathin metal layer 3 and recoated with a second sealing layer 5 as described in the preferred embodiment above. A second ultrathin metal layer 6 is then applied, followed by another sealing layer 7. Although each metal layer may contain a small percentage of defects, it is statistically unlikely that these defects will line up, so the net result is a membrane that is essentially defect free. These recoating steps may be repeated as many times as desired, so that a multiple layered "sandwich" is built up. The limiting factor is that the overall thickness of metal in the sandwich should not be so great as to reduce the flux of the permitting component below acceptable levels. However, because the performance of the composite does not rely on the integrity of any one layer, each individual layer may be made correspondingly thinner.

The configuration of the membranes is not critical to the invention, however it is envisaged that they will normally be prepared as flat sheets or as metalcoated hollow fibers. The membranes are then incorporated into a gas separation system as known in the art.

It should be understood that the examples of materials, operating parameters and techniques given above are to be interpreted as illustrative, but non-limiting of the invention. The invention is now further described with reference to the following examples.

EXAMPLES

Experimental Data and Analysis of Membrane Performance

Membranes were prepared by the casting and coating methods described above. The technique for performing the vacuum sputtering in each case was as follows. A membrane stamp of 4.75 cm diameter was cut from the support membrane material. A chlorofluorocarbon under pressure was used to blow off any dust particles adhering to the support surface. The membrane stamp was placed in a Hummer IV Sputtering System (Anatech, Ltd., Alexandria, VA),. The system was pumped down to 50 millitorr and flushed three times with argon gas. After flushing, the system was pumped down below 30 millitorr. An argon flow rate was then maintained to keep the pressure between 55 and 60 millitorr. A voltage of 3000 volts was applied to the top plate of the chamber. The plasma discharge current was 10 milliamps. Both the current and the voltage were held constant during the sputter runs. Sputter times ranged from 16 seconds to 1 hour, with 2, 5, and 10 minutes as the standards. The thickness of the sputtered layer increases linearly with sputter time, according to a calibration curve provided by the manufacturers. The validity of the curve was confirmed by weighing a number of samples before and after the sputter run. The metal used in all alloy runs was a palladium/silver alloy having a composition 786 wt % palladium, 24 wt % silver, available from Anatech Systems.

After sputtering, most composites were hand dipped in silicone rubber.

The membranes were tested by measuring the gas flux of pure gases at a pressure of 50 psig and at temperatures of 20° C. and 80° C. Gas flow measurements were made with bubble meters.

The different support membranes used in the examples can be classified in order to decreasing pore size and porosity of the skin or top layer as follows:
Polytetrafluoroethylene filter membranes—PTFE
Mciroporous polyetherimide membranes—PEI-2
Polysulfone support membranes—PSf
Polyetherimide gas separation membranes—PEI-1
Coated PSf and PEI-1 membranes: PSf/SR, PSf/SR/TPX®, PEI-1/SR, PEI-1/TPX®
(SR:silicone rubber; TPX® polymethylpentene)

EXAMPLE 1

PTFE and PEI-2 supports

Two Teflon (PTFE) supports were used: one with a 0.02 micron pore diameter and one with a 0.2 micron pore diameter. Table 1 lists the permeation rates for these membranes and for the microporous PEI-2 support. These three supports have large pores that do not seem to have been bridged by the palladium or palladium/silver layers. Because the palladium and palladium/silver layers had little effect on the flux, it appears that these supports, when uncoated, are too porous to serve as an effective support for ultrathin metal membranes.

TABLE 1

| | Permeation Rates for PTFE-Pd/Ag and PEI-2-Pd | | | | | |
|---|---|---|---|---|---|---|
| | Sputter time | Flux (cm$^3$ (STP)/cm$^2$ · s · cmHg) | | | Selectivity | |
| Membrane | (min) | CO$_2$ | N$_2$ | H$_2$ | H$_2$/CO$_2$ | H$_2$/N$_2$ |
| PEI-2-Pd | 0 | $11 \times 10^{-2}$ | $8 \times 10^{31\,2}$ | $14 \times 10^{-2}$ | 1.3 | 1.7 |
| PEI-2-Pd | 4 | $6.9 \times 10^{-2}$ | $5.4 \times 10^{-2}$ | $9.3 \times 10^{-2}$ | 1.4 | 1.7 |
| PEI-2-Pd | 8 | $6.5 \times 10^{-2}$ | $5.1 \times 10^{-2}$ | $9.2 \times 10^{-2}$ | 1.4 | 1.8 |
| PEI-2-Pd | 14 | $4.0 \times 10^{-2}$ | $3.3 \times 10^{-2}$ | $6.4 \times 10^{-2}$ | 1.6 | 1.9 |
| PTFE-Pd/Ag 0.02 μm | 0 | $4.7 \times 10^{-2}$ | $4.6 \times 10^{-2}$ | $11 \times 10^{-2}$ | 2.3 | 2.4 |
| PTFE-Pd/Ag 0.02 μm | 10 | $4.7 \times 10^{-2}$ | $4.4 \times 10^{-2}$ | $11 \times 10^{-2}$ | 2.3 | 2.5 |

TABLE 1-continued

| Permeation Rates for PTFE-Pd/Ag and PEI-2-Pd | | | | | | |
|---|---|---|---|---|---|---|
| | Sputter time | Flux (cm³ (STP)/cm² · s · cmHg) | | | Selectivity | |
| Membrane | (min) | $CO_2$ | $N_2$ | $H_2$ | $H_2/CO_2$ | $H_2/N_2$ |
| PTFE-Pd/Ag 0.02 μm | 20 | $4.7 \times 10^{-2}$ | $4.4 \times 10^{-2}$ | $11 \times 10^{-2}$ | 2.3 | 2.5 |
| PTFE-Pd/Ag 0.2 μm | 0 | $75 \times 10^{-2}$ | $55 \times 10^{-2}$ | $81 \times 10^{-2}$ | 1.1 | 1.5 |
| PTFE-Pd/Ag 0.2 μm | 10 | $75 \times 10^{-2}$ | $55 \times 10^{-2}$ | $81 \times 10^{-2}$ | 1.1 | 1.5 |
| PTFE-Pd/Ag 0.2 μm | 20 | $89 \times 10^{-2}$ | $63 \times 10^{-2}$ | $100 \times 10^{-2}$ | 1.1 | 1.6 |

EXAMPLE 2

PSf support

The microporous polysulfone (PSf) support was coated with pure palladium. Three different sputter times were used, with all other parameters held constant. The permeability of these palladium coated membranes and of the original uncoated support to five test gases ($CH_4$, $CO_2$, $O_2$, $N_2$ and $H_2$) was then measured. The results are presented in Table 2.

TABLE 2

| Premeation Rates and Selectivities for PSF-Pd Membranes | | | | | | | | | |
|---|---|---|---|---|---|---|---|---|---|
| Sputter time | Flux (cm³(STP)/cm³ · sec · cmHg) | | | | | Selectivity | | | |
| (min) | $H_2$ | $CH_4$ | $CO_2$ | $O_2$ | $N_2$ | $H_2/CH_4$ | $H_2/CO_2$ | $H_2/O_2$ | $H_2/N_2$ |
| 0 | $2.9 \times 10^{-2}$ | $1.5 \times 10^{-2}$ | $9.5 \times 10^{-3}$ | $9.0 \times 10^{-3}$ | $1.0 \times 10^{-2}$ | 1.9 | 3.1 | 3.2 | 2.9 |
| 1 | $9.1 \times 10^{-3}$ | $4.2 \times 10^{-3}$ | $2.4 \times 10^{-3}$ | $2.5 \times 10^{-3}$ | $2.9 \times 10^{-3}$ | 2.2 | 3.8 | 3.6 | 3.1 |
| 5 | $5.0 \times 10^{-3}$ | $1.8 \times 10^{-3}$ | $1.2 \times 10^{-3}$ | $1.4 \times 10^{-3}$ | $1.6 \times 10^{-3}$ | 2.8 | 4.2 | 3.6 | 3.1 |
| 10 | $1.1 \times 10^{-3}$ | $4.1 \times 10^{-4}$ | $2.6 \times 10^{-4}$ | $2.9 \times 10^{-4}$ | $3.2 \times 10^{-4}$ | 2.7 | 4.2 | 3.8 | 3.4 |
| | | Theoretical Knudsen Selectivity | | | | 2.8 | 4.7 | 4.0 | 3.7 |

The results show that the sputter coating drastically reduces the permeability of all gases through the membrane and that a longer sputter time produces a less permeable membrane. However, as shown in Table 2, the membrane selectivity toward hydrogen was not markedly changed. The selectivity $\alpha_{1,2}$ is defined as the ratio of the permeation rate of gas 1 to gas 2. A macroporous membrane will be nonselective, i.e., all $\alpha$'s are equal to 1. A finely porous membrane with pores smaller than the mean free path of the test gas will be partially selective, with a selectivity given by:

$$\alpha_{1,2} = (M_2/M_1)^{\frac{1}{2}}$$

where $M_1$ and $M_2$ are the molecular weights of gases 1 and 2, respectively. This is known as the Knudsen selectivity.

The untreated polysulfone support (sputter time=0 in Table 2) has selectivities larger than 1 but smaller than the Knudsen selectivities. This indicates a wide distribution in pore diameters within the support. The palladium coating increases the selectivity of the membrane very slightly, but the selectivity still remains lower than the Knudsen selectivity and much lower than the selectivity expected for a non-porous palladium membrane. This indicates that the metal layer does not bridge the pores, but merely coats the pore walls. It appears that the uncoated polysulfone support is too porous, or contains too many defects, to serve as the backing of a highly selective ultrathin metal membrane, which requires an essentially non-porous metal layer.

EXAMPLE 3

Polysulfone/silicone rubber support

Polysulfone/silicone rubber support membranes were sputtered with pure palladium and palladium/silver alloy. The support was sputtered at eight different sputter times with pure palladium and three with palladium alloy. The support was also sputtered at four sputter times using the pulse mode. The pulse mode allows for the intermittent pulsing of the plasma in order to provide finer layers of metal on the surface of the membrane. It was thought that the intermittent metal deposition would provide for a more even distribution in a continuous layer across the surface of the membrane.

TABLE 3

| Selectivities of PSF/SR Support Membranes | | | | | | | |
|---|---|---|---|---|---|---|---|
| Membrane | Sputter Time (min) | | | | | | |
| Selectivity | 0 | 2 | 4 | 6 | 8 | 10 | 14 |
| PSf/SR-Pd | | | | | | | |
| $\alpha H_2/CH_4$ | 1.0 | 3.4 | 7.6 | 17.1 | 2.6 | 3.2 | 2.8 |
| $\alpha H_2/CO_2$ | 0.3 | 3.4 | 7.2 | 17.9 | 2.6 | 1.0 | 3.3 |
| $\alpha H_2/O_2$ | 1.4 | 4.7 | 4.3 | 24.1 | 3.4 | 3.9 | 3.7 |
| $\alpha H_2/N_2$ | 3.2 | 6.5 | 3.9 | 22.6 | 3.7 | 5.9 | 3.7 |
| PSf/SR-Pd with pulse | | | | | | | |
| $\alpha H_2/CH_4$ | 1.0 | — | 2.9 | 2.9 | 2.8 | 2.4 | — |
| $\alpha H_2/CO_2$ | 0.3 | — | 3.2 | 3.0 | 2.9 | 2.7 | — |
| $\alpha H_2/O_2$ | 1.4 | — | 3.9 | 4.1 | 3.7 | 3.4 | — |
| $\alpha H_2/N_2$ | 3.2 | — | 4.7 | 4.2 | 4.7 | 3.5 | — |
| PSf/SR-Pd/Ag | | | | | | | |
| $\alpha H_2/N_2$ | 3.2 | 5.6 | 4.9 | — | — | 4.4 | — |

It can be seen from Table 3 that the selectivity increased slightly due to the deposition of a metal layer on top, but the increase is insignificant compared to the results expected from a palladium layer. The table also shows that the sputtered metal is not very selective for hydrogen over the other gases. A slightly better selectivity was attained at the 6 minute sputter time, but not enough to give a hydrogen purity of 99% or better. Neither the pulse mode nor use of the alloy seemed to improve the selectivity. The selectivity is essentially the same for all three membranes with the exception of the 6 minute PSf/SR-Pd membrane.

The disappointing results were attributed to the fragility of the metal layers, which were easily damaged by handling between preparation and evaluation. To overcome this problem, some of the membranes were dipped in a silicone rubber solution immediately after the vacuum sputtering run. These membranes were tested at 20° C. and 80° C. The results are given in Table 4.

TABLE 4
Permeation Rates and Selectivities for PSf/SR-Pd/Ag-SR Membranes

| Sputter Time (min) | Temp. (°C.) | Flux [cm³(STP)/cm²sec · cmHg] CO₂ | N₂ | H₂ | Selectivity $\alpha H_2/CO_2$ | $\alpha H_2/N_2$ |
|---|---|---|---|---|---|---|
| 0 | 20 | $2.5 \times 10^{-3}$ | $2.5 \times 10^{-4}$ | $8.0 \times 10^{-4}$ | 0.3 | 3.2 |
| 1 | 20 | $1.6 \times 10^{-6}$ | $1.0 \times 10^{-7}$ | $3.0 \times 10^{-5}$ | 19 | 300 |
|   | 80 | $2.8 \times 10^{-6}$ | $5.8 \times 10^{-7}$ | $1.4 \times 10^{-4}$ | 50 | 241 |
| 2 | 20 | $1.7 \times 10^{-6}$ | $4.2 \times 10^{-7}$ | $1.3 \times 10^{-5}$ | 7.6 | 31 |
|   | 80 | $9.3 \times 10^{-6}$ | $5.8 \times 10^{-7}$ | $9.3 \times 10^{-5}$ | 10 | 160 |
| 3 | 20 | $1.1 \times 10^{-6}$ | $4.5 \times 10^{-7}$ | $6.7 \times 10^{-6}$ | 6.1 | 15 |
| 5 | 20 | $1.3 \times 10^{-6}$ | $2.2 \times 10^{-7}$ | $4.1 \times 10^{-6}$ | 3.2 | 19 |

The membranes formed after sputtering with palladium alloy for one and two minutes have high hydrogen fluxes. The metal layer reduced the flux by at least 300 times for carbon dioxide, 400 times for nitrogen and only 6 to 9 times for hydrogen. The results is a membrane with high selectivity for hydrogen. The gas fluxes increase with increasing temperature. The selectivities are highest at the lower sputtering times, i.e., at one and two minutes. The high hydrogen/nitrogen selectivity indicates that the metal layer is controlling the selectivity; the untreated support has hydrogen/nitrogen selectivities lower than 10.

Comparing the results in Tables 3 and 4, it is apparent that protecting the metal layer with a silicone rubber coating is beneficial, and this was done for all membranes prepared subsequently.

EXAMPLE 4
PSf/SR/TPX® Support

A polysulfone/silicone rubber support was either wick or dip coated with polymethylpentene (TPX) to give varying TPX thicknesses. TPX was used because it was expected that the metal layer would adhere better to it than to silicone rubber. The results are presented in Table 5.

TABLE 5
Permeation Rates and Selectivities for PSf/SR/TPX-Pd/Ag-SR Membranes

| Thickness (micron) | Sputter time (min) | SR coating method | Temp. (°C.) | Flux [cm³(STP)/cm²sec · cmHg] CO₂ | N₂ | H₂ | Selectivity $\alpha H_2/CO_2$ | $\alpha H_2/N_2$ |
|---|---|---|---|---|---|---|---|---|
| 0.74 | 0 | D | 20 | $1.5 \times 10^{-4}$ | $1.2 \times 10^{-5}$ | $1.2 \times 10^{-4}$ | 0.8 | 10 |
|      |   |   | 80 | $3.2 \times 10^{-4}$ | $5.5 \times 10^{-5}$ | $3.2 \times 10^{-4}$ | 1.0 | 5.8 |
| 0.74 | 2 | W | 20 | $8.6 \times 10^{-6}$ | $6.7 \times 10^{-6}$ | $3.8 \times 10^{-5}$ | 4.4 | 5.7 |
|      |   |   | 80 | $1.8 \times 10^{-5}$ | $5.2 \times 10^{-6}$ | $1.0 \times 10^{-4}$ | 5.6 | 19 |
| 1.8  | 2 | W | 20 | $2.8 \times 10^{-7}$ | $1.8 \times 10^{-7}$ | $1.3 \times 10^{-5}$ | 46 | 72 |
|      |   |   | 80 | $1.2 \times 10^{-5}$ | $7.7 \times 10^{-7}$ | $6.7 \times 10^{-5}$ | 5.6 | 87 |
| 3.8  | 2 | W | 20 | $1.2 \times 10^{-6}$ | $1.6 \times 10^{-7}$ | $7.0 \times 10^{-6}$ | 5.8 | 44 |
|      |   |   | 80 | $7.4 \times 10^{-6}$ | $6.3 \times 10^{-7}$ | $4.9 \times 10^{-5}$ | 6.6 | 78 |
| 3.2  | 2 | D | 20 | $7.9 \times 10^{-6}$ | $3.2 \times 10^{-7}$ | $1.5 \times 10^{-5}$ | 1.9 | 47 |
|      |   |   | 80 | $2.3 \times 10^{-5}$ | $2.4 \times 10^{-6}$ | $5.1 \times 10^{-5}$ | 2.2 | 21 |
| 0.74 | 10 | D | 20 | $2.3 \times 10^{-5}$ | $8.7 \times 10^{-7}$ | $3.5 \times 10^{-5}$ | 1.5 | 40 |
|      |    |   | 80 | $9.9 \times 10^{-5}$ | $1.1 \times 10^{-5}$ | $1.3 \times 10^{-4}$ | 1.3 | 12 |
| 0.63 | 20 | D | 20 | $1.1 \times 10^{-5}$ | $5.5 \times 10^{-7}$ | $2.7 \times 10^{-5}$ | 2.5 | 49 |
|      |    |   | 80 | $4.2 \times 10^{-5}$ | $4.2 \times 10^{-6}$ | $1.0 \times 10^{-4}$ | 2.4 | 24 |

W = Wick coating
D = Dip coating

In general, the hydrogen selectivity over other gases increased with the addition of the palladium alloy layer, although the results for the 0.74-micronthick TPX are anomalous.

EXAMPLE 5
PEI-1 Support

A PEI-1 support was sputtered with palladium/silver alloy. The resulting membrane was overcoated with silicone rubber. The fluxes and selectivities obtained are shown in Table 6.

TABLE 6
Permeation Rates and Selectivities for PEI-1-Pd/Ag-SR Membranes

| Sputter Time (min) | Temp. (°C.) | Flux [cm³(STP)/cm²sec · cmHg] CO₂ | N₂ | H₂ | Selectivity $\alpha H_2/CO_2$ | $\alpha H_2/N_2$ |
|---|---|---|---|---|---|---|
| 0 | 20 | $3.4 \times 10^{-5}$ | $1.9 \times 10^{-5}$ | $1.7 \times 10^{-4}$ | 5.0 | 8.9 |
| 0.25 | 20 | $3.8 \times 10^{-6}$ | $5.6 \times 10^{-7}$ | $2.9 \times 10^{-5}$ | 7.6 | 52 |
|      | 80 | $1.1 \times 10^{-5}$ | $4.5 \times 10^{-7}$ | $1.2 \times 10^{-4}$ | 11 | 267 |
| 1 | 20 | $1.3 \times 10^{-6}$ | $4.5 \times 10^{-8}$ | $2.4 \times 10^{-5}$ | 19 | 533 |
|   | 80 | $7.0 \times 10^{-6}$ | $1.1 \times 10^{-7}$ | $6.1 \times 10^{-5}$ | 8.7 | 555 |
| 2 | 20 | $1.0 \times 10^{-6}$ | $2.6 \times 10^{-7}$ | $9.1 \times 10^{-6}$ | 9.1 | 35 |
|   | 80 | $6.2 \times 10^{-6}$ | $2.3 \times 10^{-7}$ | $8.6 \times 10^{-5}$ | 14 | 374 |
| 3 | 20 | $2.1 \times 10^{-6}$ | * | $1.0 \times 10^{-5}$ | 4.8 | * |
|   | 80 | $4.7 \times 10^{-6}$ | $3.0 \times 10^{-6}$ | $9.3 \times 10^{-5}$ | 20 | 31 |

TABLE 6-continued

| Permeation Rates and Selectivities for PEI-1-Pd/Ag-SR Membranes | | | | | | |
|---|---|---|---|---|---|---|
| Sputter Time (min) | Temp. (°C.) | Flux [cm³(STP)/cm²sec · cmHg] | | | Selectivity | |
| | | $CO_2$ | $N_2$ | $H_2$ | $\alpha H_2/CO_2$ | $\alpha H_2/N_2$ |
| 5 | 20 | $2.4 \times 10^{-6}$ | $2.9 \times 10^{-7}$ | $1.3 \times 10^{-5}$ | 5.4 | 45 |

*$N_2$ flux not measurable

Very high hydrogen/nitrogen selectivities were obtained for sputter times of 0.25, 1 and 2 minutes.

EXAMPLE 6
PEI-1/SR Support

In this case, the PEI-1 supports were sealed with a thin layer of silicone rubber before sputtering. A range of membranes was prepared by sputtering with the palladium/silver alloy. Half the membranes were then overcoated with another sealing layer of silicone rubber. The flux and selectivity results obtained with these membranes are shown in Table 7.

TABLE 7

| PEI-1/SR-Pd/Ag and PEI-1/SR-Pd/Ag-SR Multicomposite Membranes | | | | | | |
|---|---|---|---|---|---|---|
| Sputter Time (min) | Temp. (°C.) | Flux [cm³(STP)/cm²sec · cmHg] | | | Selectivity | |
| | | $CO_2$ | $N_2$ | $H_2$ | $\alpha H_2/CO_2$ | $\alpha H_2/N_2$ |
| PEI-1/SR-Pd/Ag | | | | | | |
| 0 | 20 | $2.4 \times 10^{-5}$ | $5.3 \times 10^{-7}$ | $1.0 \times 10^{-4}$ | 4.2 | 189 |
| 1 | 20 | $6.9 \times 10^{-6}$ | $1.0 \times 10^{-7}$ | $1.5 \times 10^{-5}$ | 2.2 | 150 |
| | 80 | $9.3 \times 10^{-6}$ | $3.7 \times 10^{-7}$ | $6.9 \times 10^{-5}$ | 7.4 | 186 |
| 2 | 20 | $3.3 \times 10^{-6}$ | $4.6 \times 10^{-8}$ | $9.0 \times 10^{-6}$ | 2.7 | 196 |
| | 80 | $5.9 \times 10^{-6}$ | $3.2 \times 10^{-7}$ | $6.0 \times 10^{-5}$ | 10 | 188 |
| 5 | 20 | $1.7 \times 10^{-6}$ | $2.0 \times 10^{-8}$ | $5.3 \times 10^{-6}$ | 3.1 | 265 |
| 10 | 20 | $9.0 \times 10^{-7}$ | $1.5 \times 10^{-8}$ | $4.6 \times 10^{-6}$ | 5.1 | 307 |
| PEI-1/SR-Pd/Ag-SR | | | | | | |
| 1 | 20 | $4.4 \times 10^{-6}$ | $1.8 \times 10^{-7}$ | $1.3 \times 10^{-5}$ | 3.0 | 72 |
| | 80 | $1.0 \times 10^{-5}$ | $3.8 \times 10^{-7}$ | $9.3 \times 10^{-5}$ | 9.3 | 245 |
| 2 | 20 | $1.5 \times 10^{-6}$ | $1.8 \times 10^{-8}$ | $1.3 \times 10^{-5}$ | 8.7 | 722 |
| | 80 | $4.2 \times 10^{-6}$ | $1.3 \times 10^{-7}$ | $5.3 \times 10^{-5}$ | 13 | 408 |
| 5 | 20 | $2.4 \times 10^{-6}$ | $8.7 \times 10^{-7}$ | $7.4 \times 10^{-6}$ | 3.1 | 8.5 |
| 10 | 20 | $1.4 \times 10^{-6}$ | $3.6 \times 10^{-8}$ | $9.2 \times 10^{-6}$ | 6.6 | 256 |
| | 80 | $1.5 \times 10^{-5}$ | $5.0 \times 10^{-7}$ | $7.0 \times 10^{-5}$ | 4.7 | 140 |

In this case, the unsputtered membrane has high hydrogen/nitrogen selectivity. For the two-minute sputtered membranes, the hydrogen/nitrogen selectivity decreases with increasing temperature, a characteristic of polymeric membranes. However, the hydrogen/carbon dioxide selectivity increases with increasing temperature.

EXAMPLE 7
PEI-1/TPX ® Support

PEI-1 supports were dip coated in polymethylpentene (TPX) before sputtering. Each support was tested before and after sputtering. The fluxes and selectivities are given in Table 8. The results show that the PEI-1/TPX unsputtered supports have higher selectivities and permeation rates than the sputtered supports. It seems that the sputter plasma may be damaging the TPX layer. The polymer layers are still controlling the permeation of gases through the membrane.

TABLE 8

| Permeation Rates and Selectivities for PEI-1/TPX ®-Pd/Ag-SR Membranes | | | | | | |
|---|---|---|---|---|---|---|
| Sputter Time (min) | Temp. (°C.) | Flux [cm³(STP)/cm²sec · cmHg] | | | Selectivity | |
| | | $CO_2$ | $N_2$ | $H_2$ | $\alpha H_2/CO_2$ | $\alpha H_2/N_2$ |
| 0 | 20 | $1.9 \times 10^{-5}$ | $7.4 \times 10^{-7}$ | $7.2 \times 10^{-5}$ | 3.8 | 97 |
| 2 | 20 | $8.6 \times 10^{-6}$ | $2.8 \times 10^{-7}$ | $2.3 \times 10^{-5}$ | 2.7 | 82 |
| 0 | 20 | $1.7 \times 10^{-5}$ | $6.7 \times 10^{-7}$ | $5.1 \times 10^{-5}$ | 3.0 | 76 |
| 5 | 20 | $4.4 \times 10^{-6}$ | $2.2 \times 10^{-7}$ | $1.1 \times 10^{-5}$ | 2.5 | 50 |
| 0 | 20 | $1.6 \times 10^{-5}$ | $7.8 \times 10^{-7}$ | $4.2 \times 10^{-5}$ | 2.6 | 54 |
| 10 | 20 | $5.2 \times 10^{-6}$ | $2.9 \times 10^{-7}$ | $1.3 \times 10^{-5}$ | 2.5 | 45 |
| | 80 | $1.4 \times 10^{-5}$ | $1.4 \times 10^{-6}$ | $4.4 \times 10^{-5}$ | 3.1 | 31 |

We claim:

1. A gas separation membrane for separating a preferentially permeating component and a non-preferentially permeating component from a gas mixture, comprising a polymeric substrate layer and an ultrathin metal layer coating said substrate layer, said substrate layer exhibiting a flux of said preferentially permeating component of at least $1 \times 10^{-4}$ cm³(STP)/cm²·s·cmHg, and said gas separation membrane exhibiting a flux of said preferentially permeating component of at least $1 \times 10^{-5}$ cm³(STP)/cm²·s·cmHg and wherein the selectivity for said preferentially permeating component over said non-preferentially permeating component is greater than the selectivity of said substrate layer for said components.

2. The membrane of claim 1, wherein said substrate layer comprises an asymmetric polymeric membrane coated with a sealing layer.

3. The membrane of claim 1, further comprising a sealing layer overcoating said ultrathin metal layer.

4. The membrane of claim 3, wherein said sealing layer comprises a rubbery polymer.

5. The membrane of claim 3, wherein said sealing layer comprises silicone rubber.

6. The membrane of claim 3, wherein said sealing layer is less than 5 microns thick.

7. The membrane of claim 1, wherein said substrate layer comprises a polymer chosen from the group consisting of polysulfone and polyetherimide.

8. The membrane of claim 1, wherein said ultrathin metal layer comprises a metal chosen from the group consisting of palladium alloys.

9. The membrane of claim 1, wherein said metal layer is less than 500 Å thick.

10. The membrane of claim 1, wherein said metal layer is deposited on said sealing layer by a vacuum deposition method.

11. The membrane of claim 1, wherein said substrate layer comprises a microporous polymeric membrane coated with a sealing layer.

12. The membrane of claim 1, wherein said substrate layer comprises an ultrathin, non-porous film coated with a sealing layer.

13. A process for separating a component from a mixture of gases, comprising the steps of:
providing a membrane as in claim 1, having a feed side and a permeate side;
contacting said feed side with a first gas mixture containing said component; and,
withdrawing from said permeate side a second gas mixture enriched in said component compared with said first gas mixture.

14. The process as in claim 13, wherein said component is hydrogen.

15. A method for preparing a gas separation membrane, for separating a preferentially permeating component and a non-preferentially permeating component from a gas mixture, comprising:
providing a polymeric substrate layer, coated with a first sealing layer and exhibiting a flux of said preferentially permeating component of at least $1 \times 10^{-4}$ cm$^3$(STP)/cm$^2 \cdot$s$\cdot$cmHg;
depositing on said substrate layer an ultrathin metal layer; and
overcoating said metal layer with a second sealing layer; wherein the resultant gas separation membrane exhibits a flux of said preferentially permeating component of at least $1 \times 10^{-5}$ cm$^3$(STP)/cm$^2 \cdot$s$\cdot$cmHg and wherein the selectivity for said preferentially permeating component over said non-preferentially permeating component is greater than the selectivity of said substrate layer for said components.

16. The method of claim 15, wherein said depositing step comprises vacuum deposition.

17. The method of claim 15, wherein said depositing step comprises vacuum sputtering.

* * * * *